United States Patent [19]

Markusch et al.

[11] Patent Number: 4,788,262

[45] Date of Patent: Nov. 29, 1988

[54] POLYISOCYANATE BLENDS WITH IMPROVED COMPATIBILITY WITH COREACTANTS

[75] Inventors: Peter H. Markusch, McMurray; James W. Rosthauser, Imperial; Michael C. Beatty, Pittsburgh, all of Pa.

[73] Assignee: Mobay Corporation, Pittsburgh, Pa.

[21] Appl. No.: 938,909

[22] Filed: Dec. 8, 1986

[51] Int. Cl.$^4$ ............................................. C08F 40/00
[52] U.S. Cl. .................... 525/457; 524/901; 528/67; 528/73; 528/83; 528/84; 528/85
[58] Field of Search ................ 525/457, 124; 528/67, 528/83, 84, 85, 67, 73; 524/901; 282/182

[56] References Cited

U.S. PATENT DOCUMENTS

| | | | |
|---|---|---|---|
| 4,382,114 | 5/1983 | Höhlein et al. | 428/328 |
| 4,578,426 | 3/1986 | Lenz et al. | 525/124 |
| 4,605,690 | 8/1986 | Debroy et al. | 524/901 |
| 4,687,813 | 8/1987 | Lenz et al. | 525/131 |
| 4,711,918 | 12/1987 | Kubitza et al. | 524/196 |

*Primary Examiner*—John Kight
*Assistant Examiner*—S. Acquah
*Attorney, Agent, or Firm*—Gene Harsh; Joseph C. Gil; Thomas W. Roy

[57] ABSTRACT

The present invention is directed to polyisocyanates which have improved compatibility with polyester coreactants and improved solubility in apolar solvents, the polyisocyanates containing, based on solids, (a) about 15 to 85 wt. % of an isocyanurate group-containing polyisocyanate based on hexamethylene diisocynate and (b) about 15 to 85 wt. % of a biuret group-containing polyisocyanate based on hexamethylene diisocyanate.

The present invention is additionally directed to two-component polyurethane coating compositions based on the above polyisocyanates and branched polyester polyols. Finally, the present invention is directed to a process for preparing the polyisocyanate.

2 Claims, No Drawings

POLYISOCYANATE BLENDS WITH IMPROVED COMPATIBILITY WITH COREACTANTS

BACKGROUND OF THE INVENTION

1. Field of the Invention

The present invention is directed to mixtures of polyisocyanate adducts based on hexamethylene diisocyanate which have improved compatibility with polyester coreactants and improved solubility in apolar solvents.

2. Description of the Prior Art

The use of polyisocyanates in combination with highly branched polyester polyols prepared from aromatic and/or alicyclic carboxylic acids to form hard coatings which have excellent solvent resistance is known. While it is possible to use both monomeric diisocyanates and polyisocyanate adducts as coreactants for the polyester polyols, the polyisocyanate adducts are preferred, especially in spray applications, due to their lower vapor pressure. Particularly preferred polyisocyanate adducts are the isocyanurate group-containing polyisocyanates based on hexamethylene diisocyanate. In addition to providing better weather resistance than other known polyisocyanate adducts, the isocyanurate group-containing polyisocyanates have low free monomer contents and may be formulated at high solids contents. The low free monomer contents and the ability to formulate these systems using smaller amounts of organic solvents are both important factors from an environmental point of view.

Despite the advantages obtained from using isocyanurate group-containing polyisocyanates, there are compatibility problems between these polyisocyanates and some highly branched polyester polyols used as coreactants. These compatibility problems lead to a hazy appearance in clear coatings produced from these compositions and to pigment flocculation in the corresponding pigmented coating compositions.

Accordingly, it is an object of the present invention to provide a polyisocyanate which maintains the advantages of the known isocyanurate group-containing polyisocyanates, can be formulated to produce clear coatings from unpigmented compositions and does not result in pigment flocculation in pigmented coatings. Surprisingly, these objectives may be achieved from the polyisocyanate mixture set forth hereinafter.

SUMMARY OF THE INVENTION

The present invention is directed to a polyisocyanate mixture containing, based on solids,
(a) about 15 to 85 wt. % of an isocyanurate group-containing polyisocyanate based on hexamethylene diisocyanate and
(b) about 15 to 85 wt. % of a biuret group-containing polyisocyanate based on hexamethylene diisocyanate.

The present invention is additionally directed to a two-component polyurethane coating composition based on the above polyisocyanate mixture as the isocyanate component and a polyester polyol having a molecular weight of about 500 to 5000, an average functionality of about 5 to 15 and an OH number of about 50 to 1700; and wherein at least about 50% by weight of the acid component is based on aromatic and/or alicyclic polycarboxylic acids. Finally, the present invention is directed to a process for preparing the polyisocyanate mixture.

DETAILED DESCRIPTION OF THE INVENTION

In accordance with the present invention it has been found that polyisocyanate mixtures containing, based on solids, about 15 to 85% by weight, preferably about 20 to 80% by weight, and most preferably about 50 to 80% by weight of an isocyanurate group-containing polyisocyanate based on hexamethylene diisocyanate and about 15 to 85% by weight, preferably about 20 to 80% by weight, and most preferably about 20 to 50% by weight of a biuret group-containing polyisocyanate based on hexamethylene diisocyanate may be formulated with highly branched polyester polyols to produce clear, unpigmented coatings. When pigments are added to these compositions, they remain finely dispersed throughout the composition and do not flocculate.

Isocyanurate group-containing polyisocyanates, particularly those based on hexamethylene diisocyanate, are well known and may be prepared by trimerizing hexamethylene diisocyanate in the presence of a suitable trimerization catalyst. A suitable method for preparing this product is set forth, e.g., in U.S. Pat. No. 4,324,879, herein incorporated by reference; however, any known trimerization catalysts may be used such as those disclosed in U.S. Pat. Nos. 4,518,761 and 4,552,946, both of which are herein incorporated by reference. The product essentially contains N,N',N''-tris-(6-isocyantohexyl)-isocyanurate mixed with minor quantities of its higher homologues. Commercial examples of these products are Desmodur N-3300 and Desmodur N-3390 polyisocyanates, available from Mobay Corporation.

The biuret group-containing polyisocyanates, particularly those based on hexamethylene diisocyanate, are also well known and may be prepared by reacting this diisocyanate with a suitable biuretizing agent. Processes for the preparation of these polyisocyanates are disclosed in U.S. Pat. Nos. 3,124,605; 3,358,010; 3,903,126; 3,903,127; 4,264,519; and 3,976,622, all of which are herein incorporated by reference. The biuret group-containing polyisocyanates are essentially mixtures of N,N',N''-tris-(6-isocyanto-hexyl)-biuret with minor quantities of its higher homologs. Commercial examples of these polyisocyanates include Desmodur N-75, Desmodur N-100 and Desmodur N-3200 polyisocyanates, available from Mobay Corporation.

The polyisocyanate mixtures of the isocyanurate group-containing polyisocyanates and the biuret group-containing polyisocyanates may be conveniently prepared by adding one component to the other or by blending each of the two individual components. However, it is also possible to prepare one component in the presence of the other or to prepare both components simultaneously. For example, by adding a trimerization catalyst to a biuret group-containing polyisocyanate in the presence of excess hexamethylene diisocyanate under trimerization conditions, it is possible to prepare the polyisocyanate mixtures of the present invention. Conversely, they may also be prepared by adding a biuretizing agent to an isocyanurate group-containing polyisocyanate in the presence of excess hexamethylene diisocyanate under biuretization conditions. Finally, it is also possible to add both a trimerization catalyst and a biuretizing agent to hexamethylene diisocyanate at an elevated temperature to prepare the inventive polyisocyanate mixtures.

The polyester polyols used as coreactants with the polyisocyanate mixtures according to the present invention have a molecular weight of about 500 to 5000, preferably about 800 to 4000 and most preferably about 1000 to 3000, an average functionality of about 5 to 15, preferably about 6 to 13, and an OH number of about 50 to 1700, preferably about 100 to 500 and most preferably about 200 to 350. The polyester polyols may be prepared by reacting polybasic, generally dibasic carboxylic acids with polyols wherein at least a portion of the polyols have a functionality of at least 3. In the preparation of the polyester polyols, it is possible to use the corresponding carboxylic acid anhydrides or polycarboxylic acid esters of lower alcohols instead of the free polycarboxylic acids.

Suitable aromatic or alicyclic polycarboxylic acids for preparing the polyester polyols include phthalic acid, isophthalic acid, terephthalic acid, phthalic acid anhydride, tetrahydrophthalic acid anhydride, hexahydrophthalic acid anhydride, tetrachlorophthalic acid anhydride, endomethylene tetrahydrophthalic acid anhydride, tetrahydroisophthalic acid, hexahydroisophthalic acid, tetrahydrophthalic acid, hexahydrophthalic acid, tetrahydroterephthalic acid, hexahydroterephthalic acid, dimethyl terephthalate and bis-glycol terephthalate.

In addition to the aromatic and alicyclic polycarboxylic acids which should be used in a quantity of at least about 50% by weight, preferably at least about 60% by weight of the acid component of the polyester, it is also possible to use acyclic polycarboxylic acids such as succinic acid, succinic acid anhydride, adipic acid, suberic acid, azelaic acid, sebacic acid, glutaric acid, malonic acid, and unsaturated acids such as maleic acid, maleic acid anhydride or fumaric acid. The previously described polycarboxylic acids may be unsaturated or they may be substituted, e.g., by halogen atoms. In addition to the dicarboxylic acids previously described, it is also possible to use polyfunctional carboxylic acids such as trimellitic acid or trimellitic acid anhydride in order to provide branching in the polyester polyol. However, it is preferred to introduce branching through the polyol component used to prepare the polyester polyol. Further, it is also possible to use monocarboxylic acids such as 2-ethyl hexanoic acid to control the functionality.

The low molecular weight polyols which may be used to prepare the polyester polyols include the low molecular weight chain extenders known from polyurethane chemistry. It is preferred to introduce branching into the polyester polyol by using low molecular weight polyols having a functionality of at least 3 as at least a portion of the hydroxyl component. Suitable polyfunctional chain extenders include trimethylol propane-(1,1,1), glycerol, hexanetriol-(1,2,6), butanetriol-(1,2,4), trimethylolethane-(1,1,1), pentaerythritol, mannitol, sorbitol, methylglycoside, sucrose, and 1,1,2- or 1,1,1-tris-(hydroxyphenyl)-ethane.

Low molecular weight diols and monoalcohols may be blended with the higher functional polyols in order to achieve the desired functionality. Suitable diols include ethylene glycol, propylene glycol-(1,2) and -(1,3), butylene glycol-(1,4), -(1,3), and -(2,3), hexanediol-(1,6), octanediol-(1,8), neopentyl glycol, cyclohexane dimethanol (1,4-bis-hydroxymethyl cyclohexane) and 2-methyl-13-propanediol. As in the case of monocarboxylic acids, it is also possible to use monoalcohols such as methanol, ethanol, propanol, butanol, 2-ethylhexanol, etc., in minor quantities to control the functionality.

The molar proportions of polyols and polycarboxylic acids employed are such that there is an excess of hydroxyl groups over the number of carboxylic acid groups. It will be readily apparent to one skilled in the art that the term carboxylic acid group refers to the carbonyl function regardless of whether it appears as part of an anhydride, ester or free acid group. Generally, the ratio of hydroxyl groups to carboxylic acid groups is about 4:1 to 1:1, preferably about 2:1 to 1.1:1.

The functionality of the polyester is determined from the ratio of hydroxyl groups to acid groups and from the functionalities of the individual components. The functionality ($f_{OH}$) may be determined by the following formula $$f_{OH} = \frac{\Sigma \text{ equiv}_{OH} - \Sigma \text{ equiv}_{acid}}{\Sigma \text{ moles}_{OH} + \Sigma \text{ moles}_{acid} - \Sigma \text{ equiv}_{acid}}$$

For example, if two moles of a glycol (4OH equivalents), 2 moles of a triol (6OH equivalents) and three moles of a diacid (6 acid equivalents) are reacted to form a polyester polyol, then the theoretical average functionality is four. When a monofunctional acid is used to reduce the functionality, the above formula may still be used. Thus, if one mole of a monocarboxylic acid (1 acid equivalent) is added to the above ingredients, the theoretical average functionality is three. By varying the amounts and functionalities of the individual components, polyester polyols with virtually any theoretical average functionality may be obtained.

The reaction between the glycol and the acid is carried out under normal esterification conditions well known and described in the prior art; see for example Polyurethanes: Chemistry and Technology, Part I, pages 45–46, 1962, J. H. Saunders and K. C. Frisch, John Wiley & Sons, New York, N.Y. Illustratively, the esterifications is conducted in the absence of solvent under a flow of nitrogen and at temperatures of about 150° C. to 250° C., preferably about 190° C. to 225° C. for a period of about 4 to 40 hours, preferably about 6 to 24 hours. The reaction is terminated when the acid number of the product is less than about 4, preferably less than about 2. Water of condensation which is formed as a by-product during the reaction is removed by conducting the reaction under vacuum conditions.

While catalysts are not necessary, they may be employed to shorten the esterification period. Suitable catalysts include p-toluenesulfonic acid, magnesium oxide, calcium oxide, antimony oxide, zinc oxide, lead oxide, magnesium acetate, calcium acetate, zinc acetate, lead acetate, sodium acetate, potassium acetate, sodium 2-ethylhexanoate, potassium 2-ethyl hexanoate, various organic amines, sodium methoxide, potassium methoxide, sodium alkoxytitanates, tetralkyltitanates, hydrated monobutyl tin oxide, stannous octoate, stannous chloride dihydrate and the like.

In order to prepare the two component polyurethane coating compositions, the polyester polyols are blended and reacted with the inventive polyisocyanate mixtures previously described while maintaining an NCO/OH equivalent ratio of about 3:1 to 0.5:1, preferably about 1.5:1 to 1:1.

In addition to the polyester polyols and the polyisocyanate mixtures, the coating compositions may also contain solvents, catalysts, pigments, dyes, levelling agents and the like which are well known in the field of polyurethane chemistry. Suitable solvents include the known polyurethane solvents such as toluene, xylene, butylacetate, ethylacetate, ethylene glycol monoethyl ether acetate, ethylene glycol monomethyl ether acetate, ethylene glycol monobutyl ether acetate, ethylene glycol monohexyl ether acetate, propylene glycol monomethyl ether acetate, diethylene glycol monoethyl ether acetate, diethylene glycol monobutyl ether acetate, methyl ethyl ketone, methyl isobutyl ketone, methyl amyl ketone, hydrocarbon solvents such as hexane and heptane, aromatic solvents and also mixtures of these solvents.

Suitable polyurethane catalysts include those known in polyurethane chemistry such as tertiary amines, quaternary ammonium hydroxides; alkali metal hydroxides, alkali metal alcoholates, alkali metal phenolates and, in particular, organic tin compounds. The catalysts are generally used in a quantity of about 0.001 to 10% by weight, based on the quantity of polyester used in the two component compositions according to the invention.

Suitable pigments include the known inorganic and organic pigments and dyes, particularly inorganic pigments such as iron oxide, carbon black and titanium dioxide. As previously discussed, when the isocyanurate group-containing polyisocyanates alone are used in combination with the highly branched polyester polyols, the inorganic pigments flocculate from the applied coating resulting in poor gloss readings in coatings prepared from these compositions. However, by using the inventive polyisocyanate mixtures, the problem with pigment flocculation can be prevented and coatings with high gloss readings may be obtained.

The inventive polyisocyanate mixtures also provide an additional unexpected property in that they may be blended with less polar solvents and/or coreactants such as alkyds and acrylics. Previously, it was difficult to mix apolar solvents and/or coreactants with biuret group-containing polyisocyanates based on hexamethylene diisocyanate because these polyisocyanates were not compatible with them. During the addition of the polyisocyanate or subsequently during storage, the mixtures became cloudy which resulted in the formation of hazy coatings as opposed to the desired clear coatings. However, the polyisocyanate mixtures of the present invention do not suffer from these deficiencies and, thus, may be mixed with apolar solvent and/or coreactant systems to produce clear coatings.

The invention is further illustrated but is not intended to be limited by the following examples in which all parts and percentages are by weight unless otherwise specified.

EXAMPLES

The following components were used in the examples:

Polyisocyanate A—an isocyanurate group-containing polyisocyanate having an equivalent weight of 216, prepared by trimerizing hexamethylene diisocyanate and present at 90% solids in a mixture of equal parts n-butyl acetate and solvent naphtha 100 (available as Desmodur N 3390 from Mobay Corporation).

Polyisocyanate B—the same as Polyisocyanate A except that it has a solids content of 100% and an equivalent weight of 195 (available as Desmodur N 3300 from Mobay Corporation).

Polyisocyanate C—a biuret group-containing polyisocyanate based on hexamethylene diisocyanate and having an equivalent weight of 183 (available as Desmodur N 3200 from Mobay Corporation).

Polyisocyanate D—a biuret group-containing polyisocyanate based on hexamethylene diisocyanate and having an equivalent weight of 191 (available as Desmodur N 100 from Mobay Corporation).

Polyol A—a polyester polyol present as a 75% solids solution in propylene glycol monomethyl ether acetate, having an equivalent weight of about 260 and prepared from
  47.0 parts 2-ethylhexanoic acid
  409.8 parts trimethylol propane
  239.6 parts phthalic acid anhydride and
  119.8 parts adipic acid.

Polyol B—a polyester polyol present as a 65% solids solution in propylene glycol monomethyl ether acetate, having an equivalent weight of about 325 and prepared from
  53.8 parts trimethylol propane and
  52.5 parts phthalic acid anhydride.

Additive A—a 33% solution in a 1:1 mixture of methyl ethyl ketone and propylene glycol monomethyl ether acetate of a cellulose acetate/butyrate flow aid (available as CAB-551-0.1 sec from Eastman Chemical).

Additive B—a 10% solution in propylene glycol monomethyl ether acetate of a fluorocarbon surfactant (available as FC-430 from 3M Company).

Additive C—a 50% solution in a proprietary solvent of a wetting and suspending agent based on the salt of a long chain polyaminoamide and a high molecular weight acid ester (available as Antiterra U from Byk Chemie).

Additive D—a hindered amine light stabilizer (available as Tinuvin 292 from Ciba-Geigy).

Additive E—a benzotriazole light stabilizer (available as Tinuvin 1130 from Ciba-Geigy).

Catalyst A—a 1% solution in propylene glycol monomethyl ether acetate of dibutyl tin dilaurate (available as T-12 from Air Products and Chemicals).

Catalyst B—a 10% solution in propylene glycol monomethyl ether acetate of a tertiary amine catalyst (available as Desmorapid PP from Mobay Corporation).

Solvent Blend A—a blend of 40 parts propylene glycol monomethyl ether acetate, 10 parts n-butyl acetate, 40 parts methyl ethyl ketone and 10 parts xylene.

Solvent Blend B—a blend of equal parts n-butyl acetate, methyl ethyl ketone and ethylene glycol monohexyl ether acetate.

EXAMPLE 1

(Comparison)

A pigmented polyol composition was prepared by mixing the following:
  1200.0 parts of Polyol A
  1415.3 parts TiO$_2$
  105.0 parts Additive A
  16.0 parts Additive B
  9.4 parts Additive C and
  627.6 parts Solvent Blend A.
153.8 parts of this polyol composition were mixed with 14.3 parts of Solvent Blend A, 0.6 parts Catalyst A and 50.0 parts of Polyisocyanate A. This coating composition was sprayed onto steel panels using a Binks Model 18 conventional air gun with a 66SF tip at 40 psi. The pigment flocculated in the dried coating.

The above experiment was repeated using Polyisocyanate B; however, pigment flocculation still occurred.

EXAMPLE 2

(Comparison)

100.0 parts of the polyol composition described in Example 1 were mixed with 28.4 parts of Polyisocyanate A, 3.4 parts of Polyisocyanate C, 9.6 parts of Solvent Blend A and 0.6 parts of Catalyst A. When subsequently sprayed onto steel panels in the manner of Example 1, pigment flocculation still occurred.

EXAMPLE 3

153.8 parts of the polyol composition described in Example 1 were mixed with 37.5 parts of Polyisocyanate A, 10.4 parts of Polyisocyanate C (NCO equivalent ratio 75/25), 15.2 parts of Solvent Blend A and 0.6 parts of Catalyst A. When subsequently sprayed onto steel panels in the manner of Example 1, an excellent coating was obtained which had good gloss and did not suffer from pigment flocculation.

EXAMPLE 4

(Comparison)

A pigmented polyol composition was prepared from the following:
1129.2 parts Polyol A
1280.4 parts TiO$_2$
98.8 parts Additive A
15.2 parts Additive B
12.8 parts Additive C
25.6 parts Additive D
8.0 parts Additive E
34.0 parts Catalyst B and
900.0 parts Solvent Blend A.
150 parts of the pigmented polyol composition were mixed with 44.2 parts of Polyisocyanate A to achieve an NCO/OH equivalent ratio of 1:1. The coating composition was then sprayed onto steel panels in the manner of Example 1. Again, pigment flocculation occurred.

EXAMPLE 5

150 parts of the pigmented polyol composition described in Example 4 were mixed with 22.1 parts of Polyisocyanate A and 18.4 parts of Polyisocyanate C (NCO equivalent ratio 50/50). The coating composition was applied to steel panels in the manner of Example 1. An excellent coating was obtained which had good gloss and did not suffer from pigment flocculation.

EXAMPLE 6

150 parts of the pigmented polyol composition of Example 4 were blended with a mixture of 33.1 parts of Polyisocyanate A and 9.2 parts of Polyisocyanate C (NCO equivalent ratio 75/25). The coated composition was applied to steel panels in the manner of Example 1. An excellent coating was obtained with good gloss which did not suffer from pigment flocculation.

EXAMPLE 7

(Comparison)

A clear coating composition having a solids content of 50% and NCO/OH equivalent ratio of 1.05:1 was prepared by blending 22.8 parts of Polyisocyanate A, 32.5 parts of Polyol B, 27.9 parts of Solvent Blend B and 0.21 parts of Catalyst A. A coating having a wet film thickness of 6 mils was drawn down on glass and air dried. The coating had a hazy appearance.

EXAMPLE 8

A clear coating composition having a solids content of 50% and an NHO/OH ratio of 1.05:1 was prepared by blending a mixture of 19.7 parts of Polyisocyanate B and 4.7 parts of Polyisocyanate C (NCO equivalent ratio 80/20), 39.4 parts of Polyol B, 36.4 parts of Solvent Blend B and 0.25 parts of Catalyst A. A coating, prepared in the manner of Example 7, was clear and exhibited no haze.

EXAMPLE 9

A clear coating composition was prepared by blending 19.7 parts of Polyisocyanate B and 2.2 parts of Polyisocyanate C (NCO equivalent ratio 90/10), 34.7 parts of Polyol B, 32.4 parts of Solvent Blend B and 0.22 parts of Catalyst A. A film, prepared in the same manner as in Example 7, was clearer than the film obtained in Example 7 although there was a slight haze to the film.

EXAMPLE 10

The following polyisocyanates and polyisocyanate mixtures were mixed with 80 parts of Solvent Blend B.

(A)

20 parts Polyisocyanate C (B)

20 parts Polyisocyanate D (C)

16 parts Polyisocyanate B
4 parts Polyisocyanate C (D)

16 parts Polyisocyanate B
4 parts Polyisocyanante D (E)

12 parts Polyisocyanate B
4 parts Polyisocyanate C
4 parts Polyisocyanate D (F)

4 parts Polyisocyanate B
16 parts Polyisocyanate C

Three portions of each of the above samples A–F were then stored at either room temperature, 0° C. or 60° C. for a period of 1 week and then their appearance was checked for clearness. The appearance of the samples sotred at 60° C. was also checked for clearness after 4 days.

TABLE

| | | Appearance After | | | |
|---|---|---|---|---|---|
| Example | Initial | 1 Week Ambient | 1 week 0° | 4 days 60° C. | 1 week, 60° C. |
| 9A | C[1] | P[2] | C | P | P |
| 9B | C | P | C | P | P |
| 9C | C | C | C | C | C |
| 9D | C | C | C | C | C |
| 9E | C | C | C | C | P |

TABLE-continued

| Example | Initial | Appearance After | | | |
|---|---|---|---|---|---|
| | | 1 Week Ambient | 1 week 0° | 4 days 60° C. | 1 week, 60° C. |
| 9F | C | C | C | C | P |

[1]. C = Clear
[2]. P = Precipitate

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate mixture which comprises, based on solids,
   (a) about 15 to 85 wt. % of an isocyanurate group-containing polyisocyanate based on hexamethylene diisocyanate and
   (b) about 15 to 85 wt. % of biuret group-containing polyisocyanate based on hexamethylene diisocyanate.

2. The polyisocyanate mixture of claim 1 which comprises about 50 to 80 wt. % of component (a) and about 20 to 50 wt. % of component (b).

* * * * *